(12) United States Patent
Johnston et al.

(10) Patent No.: US 8,356,336 B2
(45) Date of Patent: Jan. 15, 2013

(54) SYSTEM AND METHOD FOR DOUBLE-CAPTURE/DOUBLE-REDIRECT TO A DIFFERENT LOCATION

(75) Inventors: Keith Johnston, Austin, TX (US); Eric White, Austin, TX (US); John Martin, Austin, TX (US)

(73) Assignee: RPX Corporation, San Francisco, CA (US)

( * ) Notice: Subject to any disclaimer, the term of this patent is extended or adjusted under 35 U.S.C. 154(b) by 495 days.

(21) Appl. No.: 12/619,560

(22) Filed: Nov. 16, 2009

(65) Prior Publication Data

US 2010/0064356 A1    Mar. 11, 2010

Related U.S. Application Data

(63) Continuation of application No. 11/076,646, filed on Mar. 10, 2005, now Pat. No. 7,665,130.

(60) Provisional application No. 60/551,705, filed on Mar. 10, 2004, provisional application No. 60/551,702, filed on Mar. 10, 2004.

(51) Int. Cl.
*H04L 29/06* (2006.01)

(52) U.S. Cl. .............................. 726/3; 726/12

(58) Field of Classification Search .................. None
See application file for complete search history.

(56) References Cited

U.S. PATENT DOCUMENTS

| | | | |
|---|---|---|---|
| 5,623,601 A | 4/1997 | Vu | |
| 5,835,727 A | 11/1998 | Wong et al. | |
| 6,199,113 B1 | 3/2001 | Alegre et al. | |
| 6,226,752 B1 | 5/2001 | Gupta et al. | |
| 6,266,774 B1 | 7/2001 | Sampath et al. | |
| 6,502,135 B1 | 12/2002 | Munger et al. | |
| 6,631,416 B2 | 10/2003 | Bendinelli et al. | |
| 6,643,260 B1 | 11/2003 | Kloth et al. | |
| 6,678,733 B1 | 1/2004 | Brown et al. | |
| 6,763,468 B2 | 7/2004 | Gupta et al. | |
| 6,789,118 B1 | 9/2004 | Rao | |
| 6,798,746 B1 | 9/2004 | Kloth et al. | |
| 6,816,903 B1 | 11/2004 | Rakoshitz et al. | |
| 6,834,341 B1 | 12/2004 | Bahl et al. | |
| 6,839,759 B2 | 1/2005 | Larson et al. | |
| 6,876,668 B1 | 4/2005 | Chawla et al. | |
| 6,907,530 B2 | 6/2005 | Wang | |

(Continued)

OTHER PUBLICATIONS

Crandell et al., A Secure and Transparent Firewall Web Proxy, USENIX, Oct. 2003.*

(Continued)

*Primary Examiner* — Minh Dinh
(74) *Attorney, Agent, or Firm* — Howison & Arnott, L.L.P

(57) ABSTRACT

Embodiments disclosed herein provide a system, method, and computer program product for providing network access control for a shared network. One embodiment of a network access controller may intercept a request to access a network resource from a browser application running on a client device associated with an anonymous user and determine whether the network resource is in a set of network destinations in the shared network. If the network resource is in the set of network destinations, the network access controller may direct the browser application to the network resource. If the network resource is not in the set of network destinations, the network access controller may redirect the browser application to a pre-authentication capture destination in the shared network. From the pre-authentication capture destination the anonymous user is free to visit any of the set of network destinations in the shared network without authentication.

20 Claims, 2 Drawing Sheets

U.S. PATENT DOCUMENTS

| | | |
|---|---|---|
| 6,976,089 B2 | 12/2005 | Na et al. |
| 6,996,625 B2 | 2/2006 | Kaplan et al. |
| 7,085,385 B2 | 8/2006 | Frantz et al. |
| 7,085,854 B2 | 8/2006 | Keane et al. |
| 7,092,727 B1 | 8/2006 | Li et al. |
| 7,143,435 B1 | 11/2006 | Droms et al. |
| 7,181,542 B2 | 2/2007 | Tuomenoksa et al. |
| 7,181,766 B2 | 2/2007 | Bendinelli et al. |
| 7,185,073 B1 | 2/2007 | Gai et al. |
| 7,185,358 B1 | 2/2007 | Schreiber et al. |
| 7,188,180 B2 | 3/2007 | Larson et al. |
| 7,194,554 B1 | 3/2007 | Short et al. |
| 7,216,173 B2 | 5/2007 | Clayton et al. |
| 7,257,833 B1 | 8/2007 | Parekh et al. |
| 7,290,288 B2 | 10/2007 | Gregg et al. |
| 7,310,613 B2 | 12/2007 | Briel et al. |
| 7,316,029 B1 | 1/2008 | Parker et al. |
| 7,324,551 B1 | 1/2008 | Stammers |
| 7,386,888 B2 | 6/2008 | Liang et al. |
| 7,418,504 B2 | 8/2008 | Larson et al. |
| 7,444,669 B1 | 10/2008 | Bahl et al. |
| 7,448,075 B2 | 11/2008 | Morand et al. |
| 7,454,792 B2 | 11/2008 | Cantrell et al. |
| 7,490,151 B2 | 2/2009 | Munger et al. |
| 7,587,512 B2 | 9/2009 | Ta et al. |
| 7,590,728 B2 | 9/2009 | Tonnesen et al. |
| 7,610,621 B2 | 10/2009 | Turley et al. |
| 7,624,438 B2 | 11/2009 | White |
| 7,665,130 B2 | 2/2010 | Johnston et al. |
| 8,032,933 B2 | 10/2011 | Turley et al. |
| 8,108,915 B2 | 1/2012 | White et al. |
| 8,117,639 B2 | 2/2012 | MacKinnon et al. |
| 2002/0023210 A1 | 2/2002 | Tuomenoksa et al. |
| 2002/0026503 A1 | 2/2002 | Bendinelli et al. |
| 2002/0026531 A1 | 2/2002 | Keane et al. |
| 2002/0029276 A1 | 3/2002 | Bendinelli et al. |
| 2002/0053031 A1 | 5/2002 | Bendinelli et al. |
| 2002/0056008 A1 | 5/2002 | Keane et al. |
| 2002/0091859 A1 | 7/2002 | Tuomenoksa et al. |
| 2002/0099829 A1 | 7/2002 | Richards et al. |
| 2002/0133586 A1 | 9/2002 | Shanklin et al. |
| 2002/0138631 A1 | 9/2002 | Friedel et al. |
| 2002/0165949 A1 | 11/2002 | Na et al. |
| 2003/0069955 A1 | 4/2003 | Gieseke et al. |
| 2003/0110073 A1 | 6/2003 | Briel et al. |
| 2003/0115247 A1 | 6/2003 | Simpson et al. |
| 2003/0123442 A1 | 7/2003 | Drucker et al. |
| 2003/0182420 A1 | 9/2003 | Jones et al. |
| 2003/0212900 A1 | 11/2003 | Liu et al. |
| 2004/0064351 A1 | 4/2004 | Mikurak |
| 2004/0064560 A1 | 4/2004 | Zhang et al. |
| 2004/0083295 A1 | 4/2004 | Amara et al. |
| 2004/0107290 A1 | 6/2004 | Kaplan et al. |
| 2004/0177276 A1* | 9/2004 | MacKinnon et al. ......... 713/201 |
| 2004/0215957 A1 | 10/2004 | Moineau et al. |
| 2004/0268149 A1 | 12/2004 | Aaron |
| 2005/0021975 A1 | 1/2005 | Liu |
| 2005/0066200 A1 | 3/2005 | Bahl et al. |
| 2005/0138358 A1 | 6/2005 | Bahl et al. |
| 2006/0168454 A1 | 7/2006 | Venkatachary et al. |
| 2008/0098464 A1 | 4/2008 | Mizrah |
| 2009/0279567 A1 | 11/2009 | Ta et al. |
| 2010/0192213 A1 | 7/2010 | Ta et al. |
| 2011/0219444 A1 | 9/2011 | Turley et al. |
| 2011/0258687 A1 | 10/2011 | White et al. |
| 2012/0096517 A1 | 4/2012 | White et al. |

OTHER PUBLICATIONS

Bauer, Designing and Using DMZ Networks to Protect Internet Servers, Linux Journal, Mar. 2001.*

Office Action for U.S. Appl. No. 12/753,390, mailed Dec. 8, 2011, 19 pgs.

Notice of Allowance for U.S. Appl. No. 12/617,211, mailed Dec. 12, 2011, 8 pgs.

"FreeBSD Handbook, Chapter 30 Firewalls," 2003, found at www.freebsd.org/doc/handbook/firewalls-ipfw.html, printed Dec. 27, 2010, 13 pgs.

Watters, Paul, "Solaris 8 Administrator's Guide. Chapter 4, Network Configuration," O'Reilly & Associates, Inc., Jan. 2002, 17 pgs.

Spitzner, Lance, "Configuring network interface cards; getting your interfaces to talk," Mar. 23, 2004, 4 pgs.

Gite, Vivek, "Redhat/CentOS/Fedora Linux Open Port," Sep. 13, 2007, found at www.cyberciti.biz/faq/howto-rhel-linux-open-port-using-iptables/ printed Jan. 3, 2011, 7 pgs.

Office Action for U.S. Appl. No. 10/683,317, dated Jan. 3, 2011, 12 pgs.

Office Action issued in U.S. Appl. No. 11/076,672, mailed Jan. 7, 2010, 9 pgs.

"Cisco Common Classification Policy Language," Cisco Router and Security Device Manager 2.4 User's Guide, Ch. 34, 2007, 32 pgs., Cisco Systems, Inc., San Jose, CA.

Office Action for U.S. Appl. No. 12/506,140, mailed Feb. 18, 2011, 13 pgs.

Office Action issued in U.S. Appl. No. 11/076,591, mailed Jul. 20, 2010, 33 pgs.

Office Action issued in U.S. Appl. No. 10/683,317, mailed Jul. 23, 2010, 9 pgs.

Office Action for U.S. Appl. No. 12/579,566, mailed Oct. 6, 2010, 7 pgs.

Crandell et al., "A Secure and Transparent Firewall Web Proxy," Oct. 2003, USENIX, Retrieved from the Internet on Jul. 15, 2009: <URL: http://www.usenix.org/event/lisa03/tech/full_papers/crandell/crandell.pdf>.

Sommerlad, "Reverse Proxy Patterns," 2003 Retrieved from the Internet on Jul. 15, 2009, 27 pages: <URL: http://www.modsecurity.org/archive/ReverseProxy-book-1.pdf>.

Williamson, Matthew, "Throttling Viruses: Restricting Propagation to Defeat Malicious Mobile Code," Proceedings of the 18th Annual Computer Security Applications Conference, 2002 IEEE, 8 pages.

Williamson, et al, "Virus Throttling," Virus Bulletin Research Feature 1, Mar. 2003, 4 pages.

SP Maj, W Makairanondh, D Veal, "An Evaluation of Firewall Configuration Methods," IJSCSNS International Journal of Computer Science and Network Security, vol. 10, No. 8, Aug. 2010, 7 pgs.

Using VPN with Zone-Based Policy Firewall, May 2009, Cisco Systems, Inc., San Jose, CA, 10 pgs.

Cisco IOS Firewall Classic and Zone-Based Virtual Firewall Application Configuration Example, Document ID: 100595, Feb. 12, 2008, 20 pgs., Cisco Systems, Inc., San Jose, CA.

Class-Based Policy Provisioning: Introducing Class-Based Policy Language (CPL), Aug. 2008, 36 pgs., Cisco Systems, Inc., San Jose, CA.

Cisco IOS Zone Based Firewall Example, at http://www.linickx.com/archives/2945/cisco-ios-zon . . . , printed Dec. 7, 2010, 6 pgs., LINICKX.com.

Zone-Based Policy Firewall, Published Feb. 22, 2006, Updated Jun. 19, 2006, 46 pgs., Cisco Systems, Inc., San Jose, CA.

Applying Zone-based Firewall Policies in Cisco Security Manager, Published Mar. 2009, Revised Sep. 2009, 64 pgs., Cisco Systems, Inc., San Jose, CA.

Office Action for U.S. Appl. No. 12/506,140, mailed Aug. 4, 2011, 18 pgs.

Office Action for U.S. Appl. No. 12/506,140, mailed Sep. 1, 2010, 11 pgs.

Notice of Allowance for U.S. Appl. No. 12/579,566, mailed Aug. 26, 2011, 9 pgs.

Office Action issued in U.S. Appl. No. 12/617,211, dated Feb. 3, 2011, 14 pgs.

"Managing Firewall Services," User Guide for Cisco Security Manager 3.3.1, Oct. 2009, Ch. 11, 90 pgs., Cisco Systems, Inc., San Jose, CA.

"Cisco Common Classification Policy Language," Cisco Router and Security Device Manager 2.4 User's Guide, Ch. 34, 2008, 32 pgs., Cisco Systems, Inc., San Jose, CA.

Guide to User Documentation for Cisco Security Manager 4.0, Jun. 18, 2010, 6 pgs., Cisco Systems, Inc., San Jose, CA.

Cisco Configuration Professional: Zone-Based Firewall Blocking Peer to Peer Traffic Configuration Example, Document ID: 112237, Updated Dec. 3, 2010, 25 pgs., Cisco Systems, Inc., San Jose, CA.

Tuning Cisco IOS Classic and Zone-Based Policy Firewall Denial-of-Service Protection, 2006, 10 pgs., Cisco Systems, Inc., San Jose, CA.

Holuska, Marty, Using Cisco IOS Firewalls to Implement a Network Security Policy, Fort Hays State University/INT 490, printed Dec. 6, 2010, 5 pgs., at http://quasarint.com/Capstone/zb_policy.php.

Cisco Feature Navigator, Cisco Systems, Inc., San Jose, CA, at http://tools.cisco.com/ITDIT/CFN/Dispatch, printed on Dec. 2, 2010, 4 pgs.

Notice of Allowance for U.S. Appl. No. 12/753,390, mailed Mar. 16, 2012, 5 pgs.

Notice of Allowance for U.S. Appl. No. 12,579,566, mailed Mar. 23, 2011, 12 pgs.

Notice of Allowance for U.S. Appl. No. 12,579,566, mailed May 13, 2011, 8 pgs.

Office Action for U.S. Appl. No. 10/683,317, mailed Jun. 8, 2011, 15 pgs.

Office Action for U.S. Appl. No. 12/617,211, mailed Jul. 19, 2011, 18 pgs.

Discussion of Conceptual Difference Between Cisco IOS Classic and Zone-Based Firewalls, Oct. 2007, 4 pgs., Cisco Systems, Inc., San Jose, CA.

Cisco IOS Firewall Zone-Based Policy Firewall, Release 12.4(6)T, Technical Discussion, Feb. 2006, 77 pgs., Cisco Systems, Inc., San Jose, CA.

Zone-Based Policy Firewall Design and Application Guide, Document ID: 98628, Sep. 13, 2007, 49 pgs., Cisco Systems, Inc., San Jose, CA.

Office Action issued in U.S. Appl. No. 11/076,591, mailed Feb. 2, 2010, 34 pgs.

Alshamsi, Abdelnasir, et al., "A Technical Comparison of IPSec and SSL," Tokyo University of Technology, Jul. 8, 2004, 10 pages.

Fisher, Dennis, "NetScreen to Acquire Neoteris," IT Security & Network Security News, Oct. 6, 2003, 1 page.

Demaria, Mike, "Faster Than a Speeding VPN—Super Remote Access With Neoteris IVE," Network Computing, Sep. 9, 2002, printed Nov. 9, 2011 from http://www.networkcomputing.com/data-protection/2296249, 3 pages.

Snyder, Joel, "SSL VPN Gateways," Networkworld, Jan. 12, 2004, printed Nov. 9, 2011 from http://www.networkworld.com/reviews/2004/0112revmain.html, 10 pages.

"NetExtender for SSL-VPN," SonicWALL SSL-VPN NetExtender, Apr. 27, 2006, 30 pages.

"IPSec vs. SSL VPN: Transition Criteria and Methodology," 2007 Sonicwall, 13 pages.

Fisher, Dennis, "Symantec Acquires SSL VPN Vendor," IT Security & Network Security News, Oct. 20, 2003, printed Nov. 9, 2011 from http://www.eweek.com/index2.php?option=content& task=v . . . 1 page.

Notice of Allowance issued in U.S. Appl. No. 12/617,211, mailed Nov. 10, 2011, 8 pages.

Notice of Allowance issued in U.S. Appl. No. 10/683,317, mailed Nov. 28, 2011, 11 pages.

* cited by examiner

SYSTEM AND METHOD FOR DOUBLE-CAPTURE/DOUBLE-REDIRECT TO A DIFFERENT LOCATION

CROSS REFERENCE TO RELATED APPLICATIONS

This application is a continuation of U.S. patent application Ser. No. 11/076,646, filed Mar. 10, 2005 by inventors Keith Johnston, Eric White, and John Martin, entitled "SYSTEM AND METHOD FOR DOUBLE-CAPTURE/DOUBLE-REDIRECT TO A DIFFERENT LOCATION", now U.S. Pat. No. 7,665,130, issued on Feb. 16, 2010, which claims a benefit of priority under 35 U.S.C. §119(e) to U.S. Provisional Applications No. 60/551,705, filed Mar. 10, 2004, entitled "SYSTEM AND METHOD FOR DOUBLE-CAPTURE/DOUBLE-REDIRECT TO A DIFFERENT LOCATION," and No. 60/551,702, filed Mar. 10, 2004, entitled "SYSTEM AND METHOD FOR ACCESS SCOPE CONTROL ("WALLED GARDENS") FOR CLIENTS OF A NETWORK ACCESS GATEWAY," both of which are hereby fully incorporated by reference herein.

TECHNICAL FIELD

Embodiments disclosed herein relate to network access control and security. More particularly, embodiments disclosed herein relate to a system, method, and computer program product for providing network access control for a shared network.

BACKGROUND

Network access providers utilizing Access Controlled Network Sharing technology to provide user-specific provisioned access to private/public networks may also have a need to allow controlled access for unauthenticated users to a restricted collection of network destinations.

For example, a shopping mall owner may want to provide any on-site customer possessing a wireless device (such as a laptop computer, PDA, etc.) with access to the Web server for the mall, plus one or more other Web sites that are associated with the mall (e.g., the local Web server for a tenant in the mall, such as a department store or movie theater). In this case, the collection of Web servers that the mall owner will allow an anonymous user to visit is referred to as the "walled garden".

In addition, the mall owner may intend to provide unlimited web access to customers who agree to register with the mall owner, and identify themselves (by providing credentials—typically, in the form of a user identifier and a password that were assigned at the time they registered) whenever they wish to be granted full access to the Internet. The process of verifying a customer's credentials is referred to as "authentication".

Previous solutions would either 1) require that the network destination of the authentication service (i.e., the "captive" portal) be specified explicitly in a link on at least one of the web pages within the set of destinations that are members of the "walled garden", or 2) require that the end-user manually enter the web address of the authentication service in the address bar of their web browser.

SUMMARY OF THE DISCLOSURE

Embodiments disclosed herein provide a software-based system and method that enhances the function of a network access controller by introducing a "Pre-Authentication Capture Destination". In the standard Access Controlled Network Sharing solution, an unauthenticated client who attempts to access the network is re-directed to a challenge screen or "captive portal", where they must provide their network login credentials (e.g., user name and password).

If a Pre-Authentication Capture Destination is specified, then this behavior changes. Any attempt by an unauthenticated client to access a network resource that is not in a list of allowed destinations (i.e., the list of servers that make up the "walled garden") will result in the client being re-directed by the Network Access Controller to the Pre-Authentication Capture Destination. The unauthenticated client is then free to visit any of the servers that are included in the walled garden without authentication. Any attempt to access a web site or location that is outside of the walled garden will cause the client to be re-directed back to the Pre-Authentication Capture Destination.

At some point, the unauthenticated client may want to use network access privileges that are only available to an authenticated user. Consequently, the client must then be re-directed to an authentication URL (or "captive" portal), where they may login (or register as a new user). To accomplish this re-direction, at least one of the web sites within the walled garden can include an HTML link that references a site that is not in the walled garden and includes a special token within the "query" portion of the link's target HTTP URL (as defined in the IETF RFC-2616—"Hypertext Transfer Protocol—HTTP/1.1" and RFC-1738 "Uniform Resource Locators (URL)" specifications). This special token, referred to as the "Authentication Token", is a unique sequence of characters that are valid for use in the query portion of a URL. When the client attempts to access the referenced site, they will be captured by the Network Access Controller. However, because of the presence of the Authentication token within the HTTP URL, the Network Access Controller will re-direct the client to the authentication screen, rather than redirecting them back to the Pre-Authentication Capture Destination.

Note that there is no requirement for any web page in the walled garden to have prior knowledge of the actual authentication screen location. Consequently, the same collection of walled garden sites may be used to service multiple Network Access controllers, where each controller may utilize a different authentication portal.

Embodiments disclosed herein enable a public/private network service provider to automatically redirect anonymous clients to a pre-defined destination within a limited set of network destinations, and provides a mechanism for accessing the authentication service without requiring that the web servers in the "walled garden" know the actual authentication URL. The automatic redirection occurs whenever the anonymous client attempts to access a network destination outside of the allowed set. The anonymous client does not have to enter the network URL of a server in the "walled garden"—instead, they just have to attempt to access any well-known URL (such as www.yahoo.com), and they will be redirected to the pre-defined destination.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION

Figure 1:
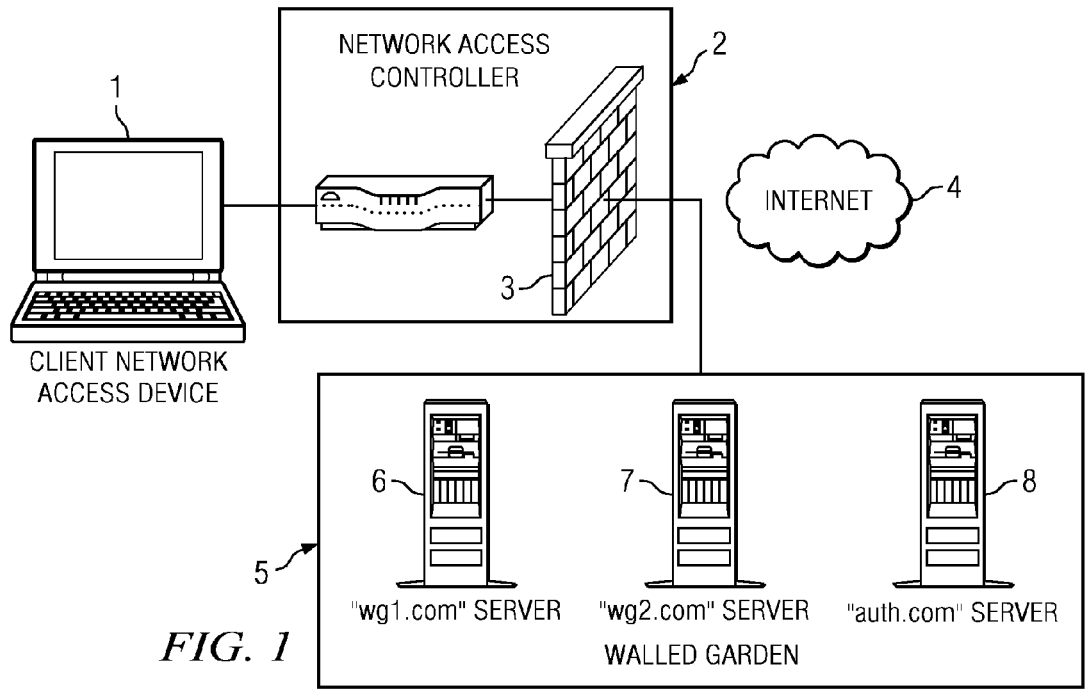
FIG. 1 is a diagrammatic representation of a system depicting the network access capability afforded to an unauthenticated client, according to one embodiment disclosed herein.

The following applications are hereby fully incorporated by reference herein in their entirety: U.S. patent application Ser. No. 10/683,317, pending, filed Oct. 10, 2003 by Richard MacKinnon, Kelly Looney, and Eric White, entitled "SYSTEM AND METHOD FOR PROVIDING ACCESS CONTROL"; U.S. Provisional Application No. 60/551,698, filed Mar. 10, 2004 by Patrick Turley, entitled "SYSTEM AND METHOD FOR BEHAVIOR-BASED FIREWALL MODELING," which converted into U.S. patent application Ser. No. 11/076,719, filed Mar. 10, 2005 by Richard MacKinnon, Kelly Looney, and Eric White, entitled "SYSTEM AND METHOD FOR BEHAVIOR-BASED FIREWALL MODELING," issued as U.S. Pat. No. 7,610,621; U.S. Provisional Application No. 60/551,754, filed Mar. 10, 2004 by Keith Johnston, entitled "SYSTEM AND METHOD FOR COMPREHENSIVE CODE GENERATION FOR SYSTEM MANAGEMENT," which converted into U.S. patent application Ser. No. 11/078,223, filed Mar. 10, 2005 by Keith Johnston, entitled "SYSTEM AND METHOD FOR COMPREHENSIVE CODE GENERATION FOR SYSTEM MANAGEMENT," issued as U.S. Pat. No. 7,509,625; U.S. Provisional Application No. 60/551,703, filed Mar. 10, 2004 by Patrick Turley and Keith Johnston, entitled "SYSTEM AND METHOD FOR PROVIDING A CENTRALIZED DESCRIPTION/CONFIGURATION OF CLIENT DEVICES ON A NETWORK ACCESS GATEWAY"; U.S. Provisional Application No. 60/551,702, filed Mar. 10, 2004 by Patrick Turley, Keith Johnston, and Steven D. Tonnesen, entitled "SYSTEM AND METHOD FOR ACCESS SCOPE CONTROL ("WALLED GARDENS") FOR CLIENTS OF A NETWORK ACCESS GATEWAY," which converted into U.S. patent application Ser. No. 11/076,591, pending, filed Mar. 10, 2005 by Patrick Turley, Keith Johnston, and Steven D. Tonnesen, entitled "METHOD AND SYSTEM FOR CONTROLLING NETWORK ACCESS"; U.S. Provisional Application No. 60/551,699, filed Mar. 10, 2004 by Patrick Turley, et al., entitled "SYSTEM AND METHOD FOR DYNAMIC BANDWIDTH CONTROL"; U.S. Provisional Application No. 60/551,697, filed Mar. 10, 2004 by Steven D. Tonnesen, entitled "SYSTEM AND METHOD FOR DETECTION OF ABERRANT NETWORK BEHAVIOR BY CLIENTS OF A NETWORK ACCESS GATEWAY," which converted into U.S. patent application Ser. No. 11/076,652, filed Mar. 10, 2005 by Steven D. Tonnesen, entitled "SYSTEM AND METHOD FOR DETECTION OF ABERRANT NETWORK BEHAVIOR BY CLIENTS OF A NETWORK ACCESS GATEWAY," issued as U.S. Pat. No. 7,590,728; U.S. Provisional Application No. 60/551,705, filed Mar. 10, 2004 by Keith Johnston, et al., entitled "SYSTEM AND METHOD FOR DOUBLE-CAPTURE/DOUBLE-REDIRECT TO A DIFFERENT LOCATION," which converted into U.S. patent application Ser. No. 11/076,646, now allowed, filed Mar. 10, 2005 by Keith Johnston, et al., entitled "SYSTEM AND METHOD FOR DOUBLE-CAPTURE/DOUBLE-REDIRECT TO A DIFFERENT LOCATION"; U.S. Provisional Application No. 60/551,704, filed Mar. 10, 2004 by Keith Johnston and Mario Garcia, entitled "SYSTEM AND METHOD FOR NETWORK MANAGEMENT XML ARCHITECTURAL ABSTRACTION," which converted into U.S. patent application Ser. No. 11/076,672, pending, filed Mar. 10, 2005 by Keith Johnston and Mario Garcia, entitled "SYSTEM AND METHOD FOR NETWORK MANAGEMENT XML ARCHITECTURAL ABSTRACTION"; and U.S. Provisional Application No. 60/660,408, filed Mar. 10, 2005 by Patrick Turley, et al., entitled "SYSTEM AND METHOD FOR PROVIDING A CENTRALIZED DESCRIPTION/CONFIGURATION OF CLIENT DEVICES ON A NETWORK ACCESS GATEWAY."

Preferred embodiments disclosed herein are illustrated in the accompanying drawings, with like numerals being used to refer to like and corresponding parts of the various drawings.

Network access providers utilizing Access Controlled Network Sharing technology to provide user-specific provisioned access to private/public networks may also have a need to allow controlled access for unauthenticated users to a restricted collection of network destinations. An example of Access Controlled Network Sharing technology is described in U.S. patent application Ser. No. 10/683,317, filed Oct. 10, 2003 by Richard MacKinnon, Kelly Looney, and Eric White, entitled "SYSTEM AND METHOD FOR PROVIDING ACCESS CONTROL." An example of a restricted collection of network destinations is referred to as the "walled garden" in U.S. Provisional Application No. 60/551,702, filed Mar. 10, 2004 by Patrick Turley, Keith Johnston and Steven D. Tonnesen, entitled "SYSTEM AND METHOD FOR ACCESS SCOPE CONTROL ("WALLED GARDENS") FOR CLIENTS OF A NETWORK ACCESS GATEWAY," which converted into U.S. patent application Ser. No. 11/076,591, filed Mar. 10, 2005 by Patrick Turley, Keith Johnston and Steven D. Tonnesen, entitled "METHOD AND SYSTEM FOR CONTROLLING NETWORK ACCESS."

To illustrate by example, assume that the following configuration has been set in the Network Access Controller 2, as depicted in FIG. 1:

Walled Garden 5 contains three servers:
wg1.com (Server 6)
wg2.com (Server 7)
auth.com (Server 8)

The Pre-Authentication Capture Destination for the embodiment of FIG. 1 will be designated http://wg1.com/welcome.html.

The Authentication Capture Destination for the embodiment of FIG. 1 will be designated https://auth.com/login.jsp.

As shown in the embodiment of FIG. 1, assume that an anonymous user has access to one of the Client network access devices 1. This user launches a Web browser and enters "www.yahoo.com" (an "external" URL, i.e., a destination that is not in the Walled Garden 5) in the address bar, and presses <Return>. The Network Access Controller 2 uses its internal Firewall 3 function to recognize the attempt by an unknown user to access an "external" location (represented by the Internet cloud 4 in FIG. 1), intercepts the request, and sends an HTTP redirect to the Client's browser, specifying the Pre-Authentication Capture URL "http://wg1.com/welcome.html". The browser then automatically performs an HTTP Get to retrieve that Web page from the wg1.com server.

At this point, the anonymous user may access Web locations on any of the three servers that are in the Walled Garden 5. For this example, assume that the Web pages on the wg1.com Server 6 include links to Web pages on the wg2.com Server 7. The anonymous user would be able to click on any of these links and view the referenced pages hosted on Server 7. However, if one of these Web pages contained a link to an "external" web site, and the user clicked on that link, then the Network Access Controller would again redirect the Client's browser back to the Pre-Authentication Capture URL http://wg1.com/welcome.html, hosted on Server 6.

Now, assume that the anonymous user decides that they want to be authenticated, so that they may be allowed access to an "external" network destination. To enable the user to login, an HTML link is included on the welcome page at "http://wg1.com/welcome.html". The link's reference URL identifies a server that is outside of the Walled Garden 5, and includes the special token string "proceedToAuthenticationURL=true" within the query portion. Note that the exact form of this special token need not be predefined; the special token is simply uniquely identifiable.

When the user clicks on this link, the Network Access Controller 2 intercepts the request. However, instead of redirecting the Client's browser to the Pre-Authentication Capture URL, the Network Access Controller 2 recognizes the presence of the token, and redirects the browser to the Authentication URL http://auth.com/login.jsp, hosted on the "auth.com" Server 8.

At this point, the user is presented with a Login page, and enters a username/password. Assuming that these credentials are valid, the "auth.com" Server 8 sends an "authorize" command to the Network Access Controller 2. This command instructs the Network Access Controller 2 to allow "external" access for the authenticated user.

Figure 2:
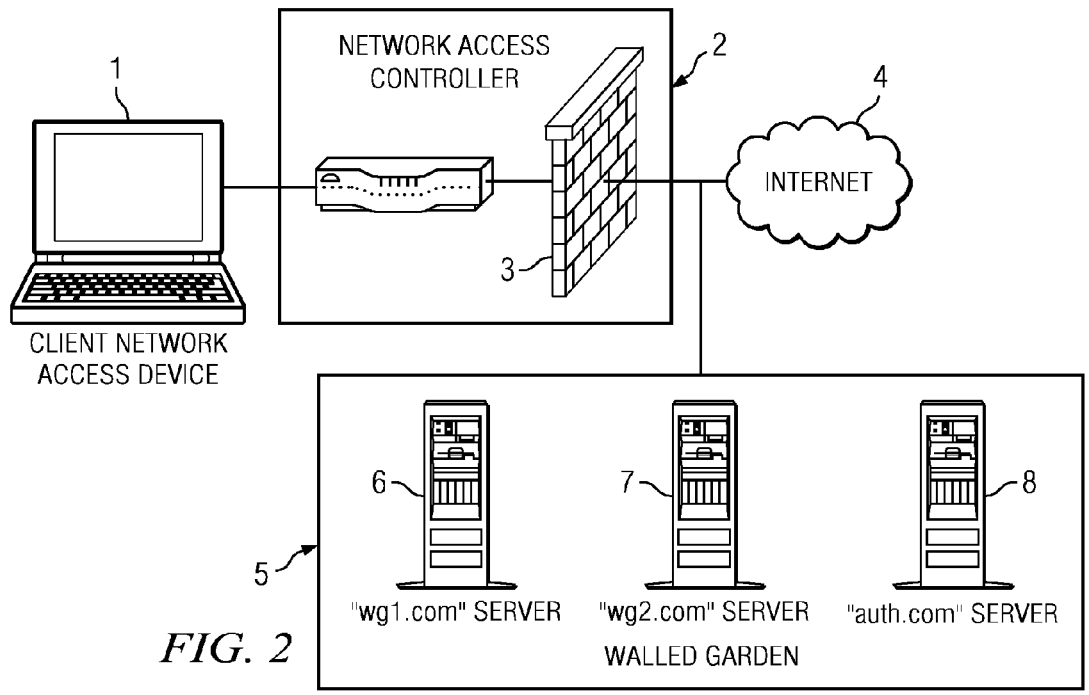
FIG. 2 is a diagrammatic representation of a system depicting the network access capability afforded to an authenticated client, according to one embodiment disclosed herein.

As shown in FIG. 2, the Client now has access to the Internet 4 ("External Network"). If the user now enters "www.yahoo.com" in the Web browser's address bar, the Network Access Controller 2 would no longer intercept this request, and the welcome page from the Yahoo web site would be displayed.

Note that, in one embodiment, this "external" access is only granted to the authenticated user. An anonymous user on a different Client would still be restricted to the Walled Garden 5.

Figure 3:
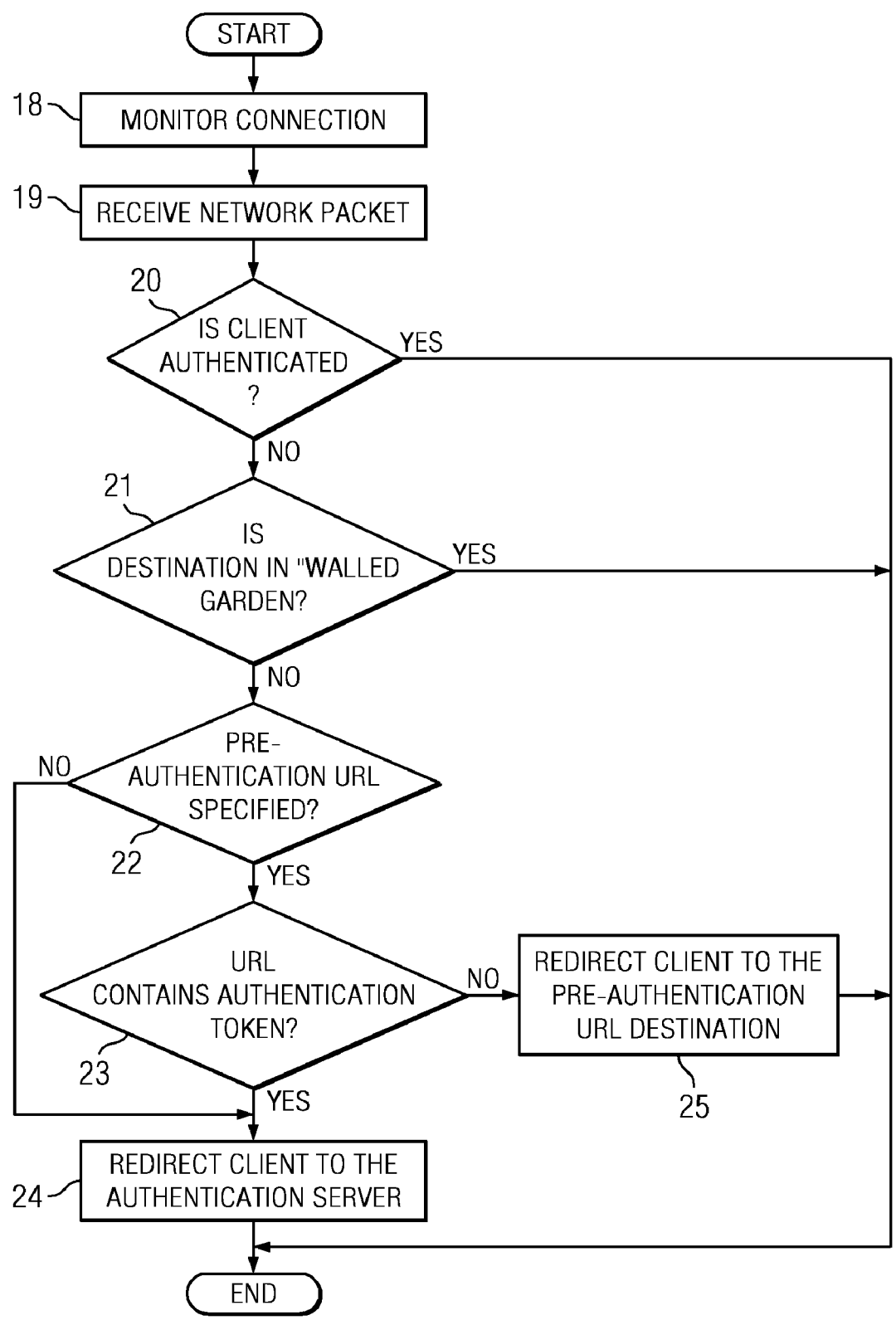
FIG. 3 is a diagrammatic representation of the flow of control (decision diagram) for a network access sharing device implementing the double-capture, double-redirect method, according to one embodiment disclosed herein.

One embodiment of the decision logic (and associated flow) that can be executed by the Network Access Controller 2 is depicted in FIG. 3. The Network Access Controller continuously monitors for network access from network access client devices 1 on its first network interface at step 18.

When a network packet is received (step 19), the Network Access Controller 2 determines if the packet is being sent by an authenticated client (step 20).

If the packet is from an authenticated client, then the Network Access Controller 2 allows the packet to pass through and be routed to its target destination ("Yes" decision fork).

If the packet is from an unauthenticated client, then the Network Access Controller 2 determines if the destination of the packet is one of the servers within the Walled Garden 5 (step 21).

If the packet is from an unauthenticated client and the destination is a server in the Walled Garden 5, then the Network Access Controller 2 allows the packet to pass through and be routed to its target server ("Yes" decision fork).

If the packet is from an unauthenticated client and the destination is not a server in the Walled Garden 5, then the Network Access Controller 2 determines if a Pre-Authentication URL has been specified (step 22).

If the packet is from an unauthenticated client, the destination is not a server in the Walled Garden 5, and a Pre-Authentication URL has not been specified, then the Network Access Controller 2 directs the client to the Authentication URL (step 24).

If the packet is from an unauthenticated client, the destination is not a server in the Walled Garden 5, and a Pre-Authentication URL has been specified, then the Network Access Controller 2 determines if the packet contains the Authentication Token (step 23).

If the packet is from an unauthenticated client, the destination is not a server in the Walled Garden 5, a Pre-Authentication URL has been specified, and the packet does not contain the Authentication Token, then the Network Access Controller 2 directs the client to the Pre-Authentication URL (step 25).

If the packet is from an unauthenticated client, the destination is not a server in the Walled Garden 5, a Pre-Authentication URL has been specified, and the packet contains the Authentication Token, then the Network Access Controller 2 directs the client to the Authentication URL (step 24).

While the present disclosure has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A method for automatic pre-authentication redirection of network traffic, comprising:
   providing a network access controller in a shared network, wherein the shared network comprises a plurality of server computers and a set of network destinations hosted on the plurality of server computers;
   intercepting at the network access controller a request to access a network resource from a browser application running on a client device within the shared network associated with an anonymous user;
   determining whether the network resource referenced in the request is in the set of network destinations hosted on the plurality of server computers in the shared network;
   if the network resource is in the set of network destinations hosted on the plurality of server computers in the shared network, directing the browser application running on the client device within the shared network associated with the anonymous user to the network resource; and
   if the network resource is not in the set of network destinations hosted on the plurality of server computers in the shared network, redirecting the browser application running on the client device within the shared network associated with the anonymous user to a pre-authentication capture destination hosted on a first server computer, wherein the first server computer is one of the plurality of server computers in the shared network and wherein from the pre-authentication capture destination the anonymous user is free to visit any of the set of network destinations hosted on the plurality of server computers in the shared network without authentication.

2. The method according to claim 1, wherein the network resource is at a network location external to the shared network.

3. The method according to claim 1, wherein the redirecting further comprises sending from the network access controller to the client device a response containing an identifier identifying the pre-authentication capture destination.

4. The method according to claim 1, further comprising:
   redirecting the browser application running on the client device back to the preauthentication capture destination when the anonymous user attempts to access any network resource that is not in the set of network destinations hosted on the plurality of server computers in the shared network.

5. The method according to claim 1, further comprising:
intercepting at the network access controller a second request from the browser application running on the client device associated with the anonymous user to access a second network resource that is not in the set of network destinations; and
determining whether the second request contains an authentication token.

6. The method according to claim 5, wherein the second request does not contain the authentication token, further comprising redirecting the browser application running on the client device associated with the anonymous user back to the pre-authentication capture destination hosted on the first server computer in the shared network.

7. The method according to claim 5, wherein the second request contains the authentication token, further comprising redirecting the browser application running on the client device associated with the anonymous user to an authentication page hosted on a second server computer in the shared network.

8. The method according to claim 7, wherein the anonymous user is authenticated by the second server computer for network access external to the shared network.

9. A computer program product comprising a non-transitory computer readable storage medium storing computer instructions translatable by a processor to perform:
intercepting at a network access controller a request to access a network resource from a browser application running on a client device within the shared network associated with an anonymous user;
determining whether the network resource referenced in the request is in a set of network destinations hosted on a plurality of server computers in a shared network;
if the network resource is in the set of network destinations hosted on the plurality of server computers in the shared network, directing the browser application running on the client device within the shared network associated with the anonymous user to the network resource; and
if the network resource is not in the set of network destinations hosted on the plurality of server computers in the shared network, redirecting the browser application running on the client device within the shared network associated with the anonymous user to a pre-authentication capture destination hosted on a first server computer, wherein the first server computer is one of the plurality of server computers in the shared network and wherein from the pre-authentication capture destination the anonymous user is free to visit any of the set of network destinations hosted on the plurality of server computers in the shared network without authentication.

10. The computer program product of claim 9, wherein the redirecting further comprises sending from the network access controller to the client device a response containing an identifier identifying the pre-authentication capture destination.

11. The computer program product of claim 9, wherein the computer instructions are further translatable by the processor to perform:
redirecting the browser application running on the client device back to the preauthentication capture destination when the anonymous user attempts to access any network resource that is not in the set of network destinations hosted on the plurality of server computers in the shared network.

12. The computer program product of claim 9, wherein the computer instructions are further translatable by the processor to perform:
intercepting at the network access controller a second request from the browser application running on the client device associated with the anonymous user to access a second network resource that is not in the set of network destinations; and
determining whether the second request contains an authentication token.

13. The computer program product of claim 12, wherein the second request does not contain the authentication token and wherein the computer instructions are further translatable by the processor to perform:
redirecting the browser application running on the client device associated with the anonymous user back to the pre-authentication capture destination hosted on the first server computer in the shared network.

14. The computer program product of claim 12, wherein the second request contains the authentication token and wherein the computer instructions are further translatable by the processor to perform:
redirecting the browser application running on the client device associated with the anonymous user to an authentication page hosted on a second server computer in the shared network.

15. The computer program product of claim 14, wherein the anonymous user is authenticated by the second server computer for network access external to the shared network and wherein the computer instructions are further translatable by the processor to perform:
allowing the client device access to the second network resource.

16. An apparatus for controlling network access, comprising:
a processor within a shared network; and
a computer readable storage medium storing computer instructions translatable by the processor to perform:
intercepting a request to access a network resource from a browser application running on a client device within the shared network coupled to the apparatus, wherein the client device is associated with an anonymous user;
determining whether the network resource referenced in the request is in a set of network destinations hosted on a plurality of server computers coupled to the apparatus, wherein the plurality of server computers resides on the shared network;
if the network resource is in the set of network destinations hosted on the plurality of server computers in the shared network, directing the browser application running on the client device within the shared network associated with the anonymous user to the network resource; and
if the network resource is not in the set of network destinations hosted on the plurality of server computers in the shared network, redirecting the browser application running on the client device within the shared network associated with the anonymous user to a pre-authentication capture destination hosted on a first server computer, wherein the first server computer is one of the plurality of server computers in the shared network and wherein from the pre-authentication capture destination the anonymous user is free to visit any of the set of network destinations hosted on the plurality of server computers in the shared network without authentication.

17. The apparatus of claim 16, wherein the computer instructions are further translatable by the processor to redirect the browser application running on the client device back to the preauthentication capture destination when the anonymous user attempts to access any network resource that is not in the set of network destinations hosted on the plurality of server computers in the shared network.

18. The apparatus of claim 16, further comprising:
a first network interface coupled to the processor, wherein the computer instructions are further translatable by the processor to continuously monitor for network access from client devices on the first network interface.

19. The apparatus of claim 18, wherein the computer instructions are further translatable by the processor to perform:
intercepting a second request from the browser application running on the client device associated with the anonymous user to access a second network resource that is not in the set of network destinations; and
determining whether the second request contains an authentication token.

20. The apparatus of claim 19, wherein the computer instructions are further translatable by the processor to perform:
if the second request does not contain the authentication token, redirecting the browser application running on the client device associated with the anonymous user back to the preauthentication capture destination hosted on the first server computer in the shared network; and
if the second request contains the authentication token, redirecting the browser application running on the client device associated with the anonymous user to an authentication page hosted on a second server computer in the shared network.

* * * * *